US010884262B2

(12) United States Patent
Wang et al.

(10) Patent No.: US 10,884,262 B2
(45) Date of Patent: Jan. 5, 2021

(54) LIQUID CRYSTAL LENS, METHOD FOR PRODUCING THE SAME, AND DISPLAY APPARATUS

(71) Applicant: BOE Technology Group Co., Ltd., Beijing (CN)

(72) Inventors: Haiyan Wang, Beijing (CN); Zhongxiao Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/577,794

(22) PCT Filed: Jul. 12, 2017

(86) PCT No.: PCT/CN2017/092599
§ 371 (c)(1),
(2) Date: Nov. 29, 2017

(87) PCT Pub. No.: WO2018/040755
PCT Pub. Date: Mar. 8, 2018

(65) Prior Publication Data
US 2018/0292664 A1    Oct. 11, 2018

(30) Foreign Application Priority Data
Aug. 31, 2016 (CN) .......................... 2016 1 0794309

(51) Int. Cl.
*G02B 30/27* (2020.01)
*G02F 1/29* (2006.01)
*G02F 1/1343* (2006.01)

(52) U.S. Cl.
CPC .............. *G02B 30/27* (2020.01); *G02F 1/29* (2013.01); *G02F 2001/134381* (2013.01); *G02F 2201/12* (2013.01)

(58) Field of Classification Search
CPC .... G02B 27/2214; G02B 27/27; G02B 27/28; G02F 1/29; G02F 1/133377; G02F 1/13394; G02F 2001/134381; G02F 1/133707
See application file for complete search history.

(56) References Cited

U.S. PATENT DOCUMENTS 9,310,616 B2    4/2016    Wu
9,429,763 B2    8/2016    Liao et al.
(Continued)

FOREIGN PATENT DOCUMENTS

CN    102629041 A    8/2012
CN    202443185 U    9/2012
(Continued)

OTHER PUBLICATIONS

International Search Report and Written Opinion and English Translation of International Search Report and Written Opinion from International Patent Application No. PCT/CN2017/092599, dated Oct. 12, 2017, 18 pages.
(Continued)

Primary Examiner — Jessica M Merlin
(74) Attorney, Agent, or Firm — Westman, Champlin & Koehler, P.A.

(57) ABSTRACT

This disclosure provides a liquid crystal lens, a method for producing the same, and a display apparatus. This liquid crystal lens comprises: a first substrate and a second substrate, wherein a plurality of prism units are provided between the first substrate and the second substrate, each of the prism units comprises a first electrode and a second electrode group, the second electrode group comprises a plurality of second electrodes, a liquid crystal layer is provided between the first electrode and the second electrode group, a transparent insulating separation structure is provided between two adjacent prism units, and the refrac-
(Continued)

tive index of the separation structure is the same as that of the long axis of the liquid crystal molecule constituting the liquid crystal layer. The liquid crystal lens in this disclosure is used for a naked-eye 3D display apparatus.

12 Claims, 3 Drawing Sheets

(56) References Cited

U.S. PATENT DOCUMENTS

| | | | |
|---|---|---|---|
| 9,810,912 | B2 | 11/2017 | Wang et al. |
| 2012/0307169 | A1* | 12/2012 | Ohyama ............ G02B 27/2214 349/33 |
| 2013/0016312 | A1 | 1/2013 | Kim et al. |
| 2013/0063691 | A1* | 3/2013 | Takama .............. G02F 1/13394 349/143 |
| 2015/0002794 | A1* | 1/2015 | Liu ................... G02F 1/134309 349/106 |
| 2016/0011443 | A1 | 1/2016 | Jeon et al. |
| 2018/0180966 | A1* | 6/2018 | Song ........................ G02F 1/09 |

FOREIGN PATENT DOCUMENTS

| | | |
|---|---|---|
| CN | 102809840 A | 12/2012 |
| CN | 103558724 A | 2/2014 |
| CN | 103984153 A | 8/2014 |
| CN | 104252083 A | 12/2014 |
| CN | 105116643 A | 12/2015 |
| CN | 105301823 A | 2/2016 |
| CN | 106154683 A | 11/2016 |
| EP | 2813886 A1 | 12/2014 |
| EP | 2 818 913 B1 | 2/2017 |

OTHER PUBLICATIONS

Second Office Action, including Search Report, for Chinese Patent Application No. 201610794309.1, dated Nov. 23, 2018, 41 pages.

* cited by examiner

LIQUID CRYSTAL LENS, METHOD FOR PRODUCING THE SAME, AND DISPLAY APPARATUS

CROSS-REFERENCE TO RELATED APPLICATION

This application is a Section 371 national Stage Application of International Application No. PCT/CN2017/092599, filed on 12 Jul. 2017, which has not yet been published, and claims priority to Chinese Patent Application No. 201610794309.1 filed on Aug. 31, 2016, the contents of which are incorporated by reference in their entirety.

TECHNICAL FIELD

This disclosure relates to the technical field of display, and particularly to a liquid crystal lens, a method for producing the same, and a display apparatus.

BACKGROUND ART

In recent years, more and more people begin to use naked-eye 3D display apparatuses. An existing naked-eye 3D display apparatus is composed of a display panel and a grating, wherein the grating comprise a plurality of grating units, and the grating is provided in front of the display panel in a certain manner. After the light in the naked-eye 3D display apparatus passes through the grating and is subjected to image splitting, different visual images may be allowed to be seen by both eyes of a person so as to generate stereo perception. Typically, grating units used for the naked-eye 3D display apparatus are achieved by means of a liquid crystal lens (LC lens).

SUMMARY OF INVENTION

Embodiments of this disclosure provide a liquid crystal lens, a method for producing the same, and a display apparatus, and are used to form a liquid crystal lens having a desirable morphology, so that the display effect of the display apparatus can be improved.

In one aspect of this disclosure, there is provided a liquid crystal lens. This liquid crystal lens may comprise a first substrate and a second substrate, wherein a plurality of prism units are provided between the first substrate and the second substrate, each of the prism units comprises a first electrode and a second electrode group, the second electrode group comprises a plurality of second electrodes, a liquid crystal layer is provided between the first electrode and the second electrode group, a transparent insulating separation structure is provided between two adjacent prism units, and the refractive index of the separation structure is the same as that of the long axis of the liquid crystal molecule constituting the liquid crystal layer.

In the liquid crystal lens provided in this disclosure, a transparent insulating separation structure is provided between two adjacent prism units, and the refractive index of this separation structure is the same as that of the long axis of the liquid crystal molecule constituting the liquid crystal layer. Therefore, this separation structure can substitute for liquid crystal molecules in the position where the separation structure in the related art is located, without filling liquid crystal molecules in the position where the separation structure is located. By this configuration, it is possible to avoid the circumstance of disordered deflecting direction of liquid crystal molecules in the position where the separation structure is located after drive voltage is applied to the first electrode and the second electrode group, so as to avoid the occurrence of disclination phenomenon of the liquid crystal. In this manner, the liquid crystal lens may have a desirable morphology, so that the phenomena of parasitic light and crosstalk will not occur in the naked-eye 3D display apparatus produced by using this liquid crystal lens. Therefore, the display effect of the naked-eye 3D display apparatus may be improved.

In another aspect of this disclosure, there is further provided a method for producing a liquid crystal lens. This method comprises:

providing a first substrate and a second substrate; and forming a plurality of prism units between the first substrate and the second substrate, wherein each of the prism units comprises a first electrode and a second electrode group, the second electrode group comprises a plurality of second electrodes, a liquid crystal layer is provided between the first electrode and the second electrode group, and wherein a transparent insulating separation structure is provided between two adjacent prism units, and the refractive index of the separation structure is the same as that of the long axis of the liquid crystal molecule constituting the liquid crystal layer.

In the liquid crystal lens produced by the method for producing a liquid crystal lens provided by this disclosure, a separation structure is provided between two adjacent prism units, and the refractive index of this separation structure is the same as that of the long axis of the liquid crystal molecule constituting the liquid crystal layer. Therefore, this separation structure can substitute for liquid crystal molecules in the position where the separation structure in the related art is located, without filling liquid crystal molecules in the position where the separation structure is located. By this configuration, it is possible to reduce the circumstance of disordered deflecting direction of liquid crystal molecules in the position where the separation structure is located after drive voltage is applied to the first electrode and the second electrode group, so as to avoid the occurrence of disclination phenomenon of the liquid crystal. In this manner, this liquid crystal lens may have a desirable morphology, so that the phenomena of parasitic light and crosstalk will not occur in the naked-eye 3D display apparatus produced by using the liquid crystal lens. Therefore, the display effect of the naked-eye 3D display apparatus may be improved.

In still another aspect of this disclosure, there is further provided a display apparatus. This display apparatus comprises the liquid crystal lens in any one of embodiments described herein.

DESCRIPTION OF DRAWINGS

In order to illustrate the technical solutions in embodiments of this disclosure or in the prior art more clearly, figures required for describing the embodiments will be simply introduced below. It is apparent that the figures described below are merely some embodiments of this disclosure, and other figures may be further obtained by those of ordinary skill in the art according to these figures without exerting inventive work.

DESCRIPTION OF EMBODIMENTS

The technical solutions in embodiments of this disclosure will be clearly and fully described below in conjunction with accompanying drawings in embodiments of this disclosure. Obviously, the embodiments described are a part of the embodiments of this disclosure, rather than all of the embodiments. Based on the embodiments of this disclosure, all other embodiments obtained by those of ordinary skill in the art without performing inventive work belong to the scope protected by this disclosure.

It is worth noting that in the case where specific elements of this disclosure may be partially or fully achieved by using a known component (or method or process), this known component (or method or process) required for understanding this disclosure will be merely described, and detailed description of other parts of this known component will be omitted so as not to confuse this disclosure. Furthermore, various embodiments comprise equivalents known at present and in the future, which are equivalent to the component involved here by way of illustration.

Singular forms of the words used herein and the appended claims comprise plural forms, unless clearly indicated otherwise in the context, vice versa. Therefore, when reference is made to a singular form of a term, a corresponding plural form of this term is typically encompassed. Similarly, the words "have", "comprise", "include", and grammatical variants thereof will be explained to be inclusive but not exclusive, unless clearly inhibited otherwise herein. Where the term "example" is used herein, particularly where it lies behind a group of terms, said "example" is merely exemplary and illustrative, and should not be considered to be exclusive or extensive.

In the related art, a liquid crystal lens may comprise an upper substrate, a lower substrate, an upper electrode provided on the upper substrate, a plurality of strip electrodes provided on the lower substrate, and a liquid crystal layer located between the plurality of strip electrodes and the upper electrode.

Figure 1:
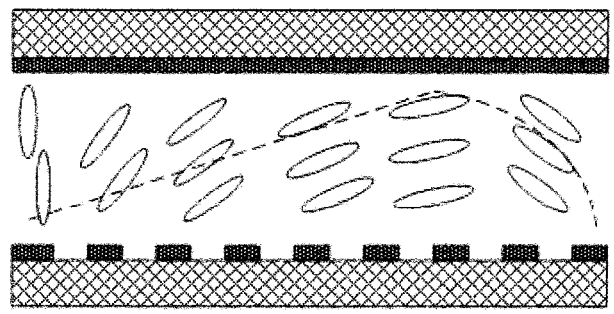
FIG. 1 illustrates a structural schematic diagram of a liquid crystal lens in the related art.

Upon operation, drive voltage is applied to the upper electrode and the plurality of strip electrode to form a gradient electric field. This gradient electric field allows the liquid crystal between the upper substrate and the lower substrate to have different rotation directions, so that the liquid crystal lens has the function of a grating, and naked-eye 3D display is achieved. However, in the structure of a liquid crystal lens in the related art, interference between two adjacent strip electrodes will occur, leading to disordered deflecting direction of liquid crystal molecules in the liquid crystal layer. As shown in FIG. 1, disclination phenomenon of the liquid crystal occurs due to the interference between adjacent strip electrodes, and it fails to form a liquid crystal lens having a desirable morphology. Therefore, the phenomena of parasitic light and crosstalk will easily occur in the naked-eye 3D display apparatus produced by using a liquid crystal lens, leading to a relatively bad display effect of the naked-eye 3D display apparatus.

In embodiments of this disclosure, there are provided a liquid crystal lens, a method for producing the same, and a display apparatus. A liquid crystal lens having a desirable morphology can be formed, so that the display effect of the display apparatus can be improved.

Figure 2:
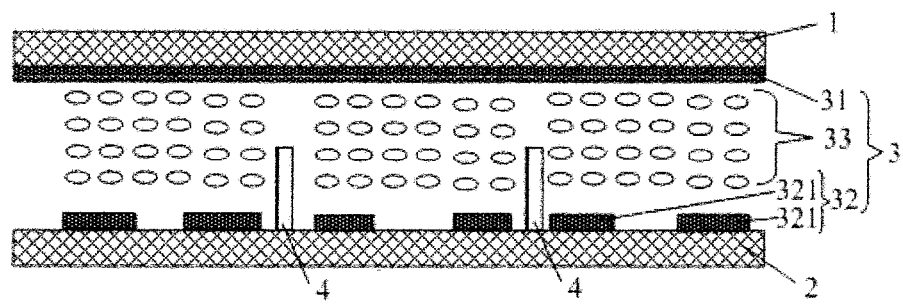
FIG. 2 illustrates a structural schematic diagram of a liquid crystal lens provided by an embodiment of this disclosure.

In one aspect of this disclosure, there is provided a liquid crystal lens. As shown in FIG. 2, this liquid crystal lens may comprise a first substrate 1 and a second substrate 2. A plurality of prism units 3 may be provided between the first substrate 1 and the second substrate 2. Each of the prism units 3 may comprise a first electrode 31 and a second electrode group 32. The second electrode group 32 may comprise a plurality of second electrodes 321. A liquid crystal layer 33 is provided between the first electrode 31 and the second electrode group 32. A transparent insulating separation structure 4 may be provided between two adjacent prism units 3, and the refractive index of the separation structure 4 is the same as that of the long axis of the liquid crystal molecule constituting the liquid crystal layer 33.

In an embodiment of this disclosure, the first electrode may be provided on the first substrate 1, and the plurality of second electrodes 321 may be provided on the second substrate 2.

When the liquid crystal lens provided by an embodiment of this disclosure is in operation, drive voltage may be applied to the first electrode 31 and the second electrode group 32 to form a gradient electric field. This gradient electric field may allow liquid crystal molecules in the liquid crystal layer 33 to have different rotation directions, so that the liquid crystal lens has the function of a grating, and naked-eye 3D display is achieved.

In an embodiment of this disclosure, when prism units are distributed in a form of grid or distributed in array, a separation structure may be provided between two adjacent prism units in each line, and a separation structure may also be provided between two adjacent prism units in each raw.

In a technical solution of this embodiment, a transparent insulating separation structure 4 is provided between two adjacent prism units 3, and the refractive index of this separation structure 4 is the same as that of the long axis of the liquid crystal molecule constituting the liquid crystal layer 33. Therefore, this separation structure 4 can substitute for liquid crystal molecules in the position where the separation structure 4 is located, without filling liquid crystal molecules in the position where the separation structure 4 is located. By this configuration, it is possible to avoid the circumstance of disordered deflecting direction of liquid crystal molecules in the position where the separation structure 4 is located after drive voltage is applied to the first electrode 31 and the second electrode group 32, so as to be capable of avoiding the occurrence of disclination phenomenon of the liquid crystal. Therefore, a liquid crystal lens having a desirable morphology can be formed. In this manner, the phenomena of parasitic light and crosstalk will not occur in the naked-eye 3D display apparatus produced by using this liquid crystal lens. Therefore, the display effect of the naked-eye 3D display apparatus may be improved.

Exemplarily, two specific positions for setting the separation structure in the structure of the liquid crystal lens may be provided in embodiments of this disclosure.

In one embodiment, as shown in FIG. 2, the separation structure 4 may be provided on the second substrate 1. In this embodiment, the height of the separation structure 4 may be ½ to ¾ of the thickness of the liquid crystal layer, wherein the height direction of the separation structure 4 is consistent with the thickness direction of the liquid crystal layer 33.

Figure 3:
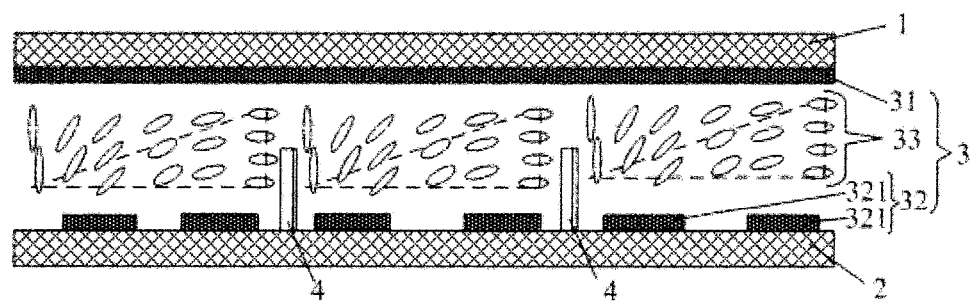
FIG. 3 illustrates a schematic diagram of the morphology of a liquid crystal lens provided by an embodiment of this disclosure.

When the separation structure 4 is provided on the second substrate, the separation structure 4 may not be required to penetrate the entire thickness of the liquid crystal layer 33. As long as the separation structure 4 has the height with the abovementioned ratio to the thickness of the liquid crystal layer, it may serve to substitute for liquid crystal molecules in the position where the separation structure 4 in the related art is located. As shown in FIG. 3, after voltage is applied to the first electrode 31 and the second electrode group 32 in the liquid crystal lens having the structure described above, the morphology of the liquid crystal lens formed by the deflection of liquid crystal molecules in the liquid crystal layer 33 is substantially consistent with a desirable morphology of a liquid crystal lens (a desirable morphology of a liquid crystal lens being as shown by the dashed line). This allows that the phenomena of parasitic light and crosstalk will not occur in the naked-eye 3D display apparatus produced by using this liquid crystal lens. Therefore, the display effect of the naked-eye 3D display apparatus may be improved.

Figure 4:
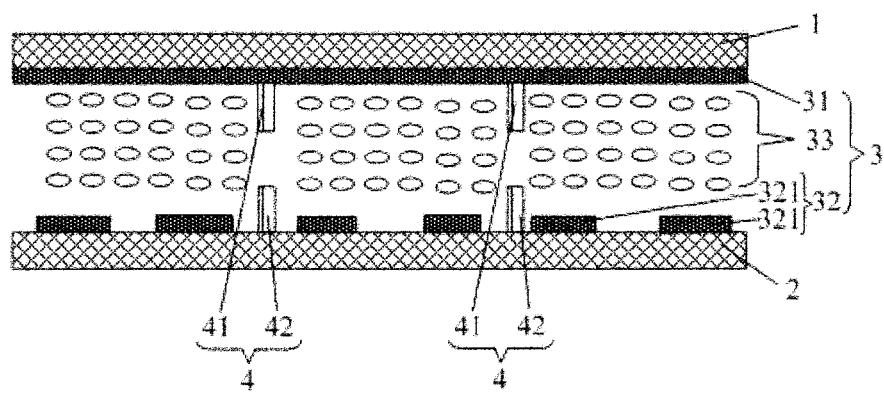
FIG. 4 illustrates a structural schematic diagram of another liquid crystal lens provided by an embodiment of this disclosure.

In another embodiment, as shown in FIG. 4, the separation structure 4 may comprise a first separator 41 and a second separator 42. the first separator 41 may be provided on the first electrode 31, and the second separator 42 may be provided on the second substrate 2. In this embodiment, the height of the first separator 41 and the height of the second separator 42 may be ¼ to ½ of the height of the liquid crystal layer, wherein the height directions of the first separator 41 and the second separator 42 are consistent with the thickness direction of the liquid crystal layer 33.

Figure 5:
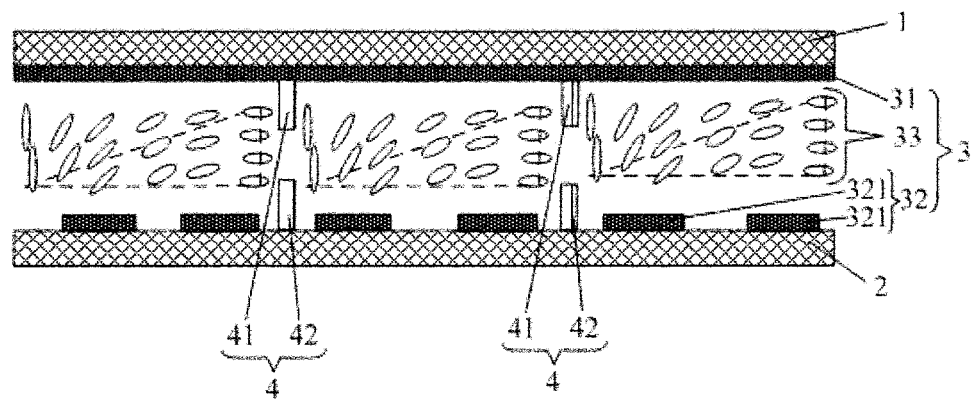
FIG. 5 illustrates a schematic diagram of the equivalent morphology of another liquid crystal lens provided by an embodiment of this disclosure.

When the separation structure 4 is provided on the second substrate, the desired height of the separation structure 4 is relatively high, and the process difficulty upon production is relatively large. Therefore, separators may be simultaneously provided on the first electrode 31 and the second substrate 2. In this configuration, as long as the height of the first separator 41 and the height of the second separator 42 reach ¼ to ½ of the thickness of the liquid crystal layer 33, it may serve to substitute for liquid crystal molecules in the position where the separation structure 4 in the related art is located. Therefore, the process difficulty during the production of the liquid crystal lens may be reduced. As shown in FIG. 5, after voltage is applied to the liquid crystal lens having the structure described above, the morphology of the liquid crystal lens formed by the deflection of liquid crystal molecules in the liquid crystal layer 33 is also substantially consistent with a desirable morphology of a liquid crystal lens (a desirable morphology of a liquid crystal lens being as shown by the dashed line). This allows that the phenomena of parasitic light and crosstalk will not occur in the naked-eye 3D display apparatus produced by using this liquid crystal lens. Therefore, the display effect of the naked-eye 3D display apparatus may be improved.

Additionally, in the structures of two liquid crystal lenses illustrated in FIG. 2 and FIG. 4, if the width of the separation structure is less than 1 μm, this separation structure cannot fully substitute for liquid crystal molecules in the position where the separation structure in the related art is located; and if the width of the separation structure is excessively large, the process has a relatively large difficulty and will be not easily achieved when production is carried out by using the production process of the liquid crystal lens. Therefore, in an embodiment of this disclosure, the width of the separation structure may be 1 μm to 5 μm.

In an embodiment of this disclosure, the refractive index of the long axis of the liquid crystal molecules is typically 1.8, and the material of the separation structure 4 can be selected by the person skilled in the art according to practical needs. Exemplarily, in an embodiment of this disclosure, a resin having a relatively high transmittance may be selected as the material which forms the separation structure. By producing the separation structure from a resin, on the one hand, it is allowed that this separation structure can substitute for liquid crystal molecules in the position where the separation structure in the related art is located, and on the other hand, the transmittance of the liquid crystal lens will not be affected. Furthermore, the display effect of the naked-eye 3D display apparatus produced from this liquid crystal lens may be ensured. Particularly, the material of the separation structure may be selected from a methyl acrylate resin, an ethyl acrylate resin, a 2-methyl methacrylate resin, 2-ethyl methacrylate resin, or the like.

Figure 6:
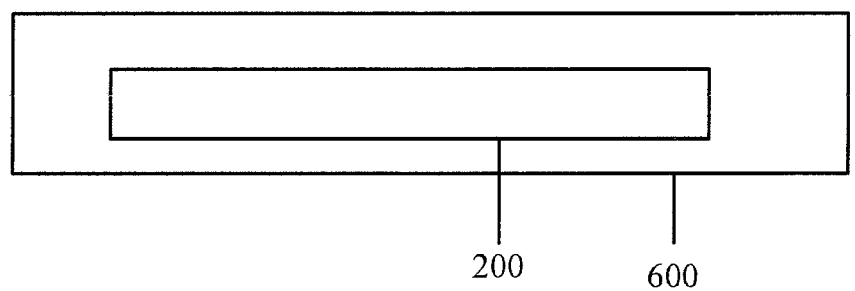
FIG. 6 illustrates a schematic diagram of a display apparatus provided by an embodiment of this disclosure.

In another aspect of this disclosure, there is further provided a display apparatus. As shown in FIG. 6, this display apparatus 600 may comprise at least one liquid crystal lens 200 according to this disclosure, such as at least one liquid crystal lens in one or more embodiments disclosed in detail above and/or below. Therefore, with respect to optional embodiments of the display apparatus, embodiments of the liquid crystal lens can be referred to. Additionally, the display apparatus provided by this disclosure may further comprise other known structures which are not described in detail herein, and may be set by the person skilled in the art as needed. Verbose words are omitted herein.

Optionally, the display apparatus may be any product or member with display function, such as a liquid crystal panel, an electronic paper, a liquid crystal television, a liquid crystal display, a digital photo frame, a cell phone, a tablet computer, and the like.

In still another aspect of this disclosure, there is further provided a method for producing a liquid crystal lens. This method may be used to produce at least one liquid crystal lens according to this disclosure, such as at least one liquid crystal lens according to one or more embodiments disclosed in detail above and/or below. Therefore, with respect to optional embodiments of this method, embodiments of the liquid crystal lens described herein can be referred to. This method comprises the steps described below, and may be performed in a given order or in a different order. Additionally, additional method steps which are not listed may be provided, and two or more or even all of method steps may be at least partly performed simultaneously.

Figure 7:
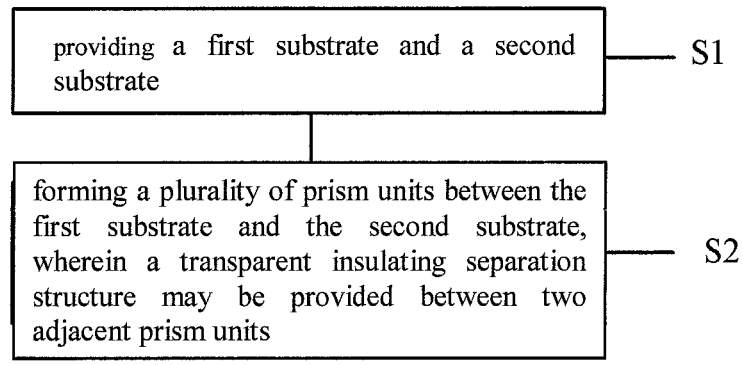
FIG. 7 illustrates a schematic flow chart of a method for producing a liquid crystal lens provided by an embodiment of this disclosure.

As shown in FIG. 7, the method for producing a liquid crystal lens may comprise steps S1-S2. In step S1, a first substrate and a second substrate may be provided. In step S2, a plurality of prism units may be formed between the first substrate and the second substrate, wherein each of the prism units may comprise a first electrode and a second electrode group, the second electrode group may comprise a plurality of second electrodes, a liquid crystal layer may be provided between the first electrode and the second electrode group, and wherein a transparent insulating separation structure may be provided between two adjacent prism units, and the refractive index of the separation structure is the same as that of the long axis of the liquid crystal molecule constituting the liquid crystal layer. In the liquid crystal lens produced by using the method for producing a liquid crystal lens described herein, a transparent insulating separation structure is provided between two adjacent prism units, and the refractive index of this separation structure is the same as that of the long axis of the liquid crystal molecule constituting the liquid crystal layer. Therefore, this separation structure can substitute for liquid crystal molecules in the position where the separation structure in the related art is located, without filling liquid crystal molecules in the position where the separation structure is located. By this configuration, it is possible to avoid the occurrence of disordered deflecting direction of liquid crystal molecules in the position where the separation structure is located after drive voltage is applied to the first electrode and the second electrode group, so as to be capable of avoiding the occurrence of disclination phenomenon of the liquid crystal. Therefore, this liquid crystal lens may have a desirable morphology. In this manner, it may be allowed that the phenomena of parasitic light and crosstalk will not occur in the naked-eye 3D display apparatus produced by using this liquid crystal lens. Therefore, the display effect of the naked-eye 3D display apparatus may be improved.

Figure 8:
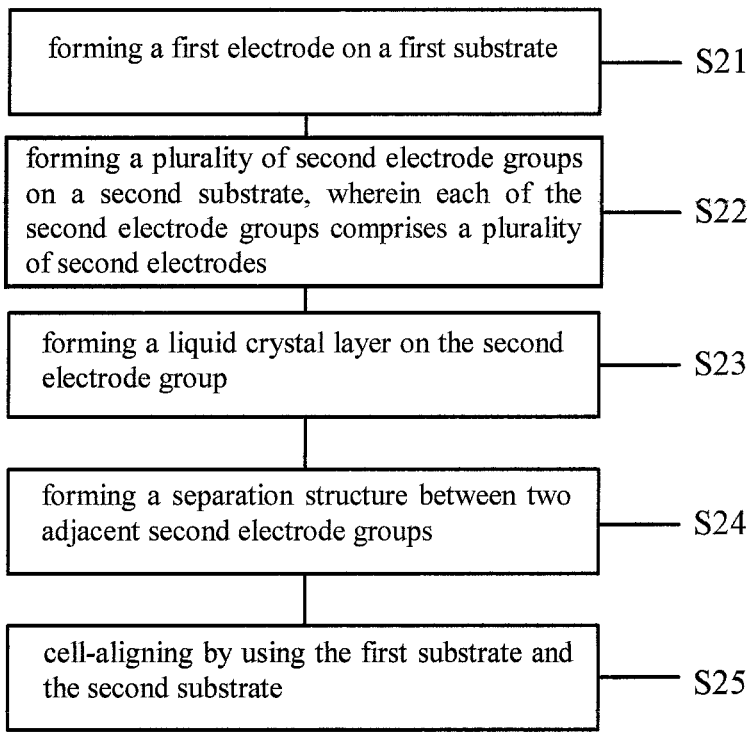
FIG. 8 illustrates a schematic flow chart of a method for forming a plurality of prism units.

In an embodiment of this disclosure, a plurality of prism units may be formed by steps S21-S25 illustrated in FIG. 8. As shown in FIG. 8, in step S21, a first electrode is formed on a first substrate. In step S22, a plurality of second electrode groups are formed on a second substrate wherein each of the second electrode groups comprises a plurality of second electrodes. In step S23, a liquid crystal layer is formed on the second electrode group. In step S24, a separation structure is formed between two adjacent second electrode groups. In step S25, cell-aligning is performed by using the first substrate and the second substrate.

In one embodiment, forming a separation structure between two adjacent second electrode groups may comprise: forming a separation structure on the second substrate, wherein the height of the separation structure may be ½ to ⅔ of the thickness of the liquid crystal layer, and the height direction of the separation structure is consistent with the thickness direction of the liquid crystal layer.

When the separation structure is provided on the second substrate, the separation structure may not be required to penetrate the entire thickness of the liquid crystal layer. As long as the separation structure has the height with the abovementioned ratio to the thickness of the liquid crystal layer, it may serve to substitute for liquid crystal molecules in the position where the separation structure 4 in the related art is located, without filling liquid crystal molecules in the position where the separation structure is located. By this configuration, it is possible to avoid the circumstance of disordered deflecting direction of liquid crystal molecules in the position where the separation structure is located after voltage is applied to the first electrode and the second electrode, so as to avoid the occurrence of disclination phenomenon of the liquid crystal. Therefore, this liquid crystal lens may have a desirable morphology.

In another embodiment, forming a separation structure between two adjacent second electrode groups may comprise: forming a first separator on the first substrate and forming a second separator on the second substrate, wherein the height of each of the first separator and the second separator is ¼ to ½ of the thickness of the liquid crystal layer, and the height directions of the first separator and the second separator are consistent with the thickness direction of the liquid crystal layer.

When the separation structure is provided on the second substrate, the desired height of the separation structure is relatively high, and the process difficulty upon production is relatively large. Therefore, separation structures may be simultaneously provided on the first substrate and the second substrate. In this configuration, as long as the height of the first separator and the height of the second separator reach ¼ to ½ of the thickness of the liquid crystal layer, it may serve to substitute for liquid crystal molecules in the position where the separation structure in the related art is located. Therefore, the process difficulty during the production of the liquid crystal lens may be reduced.

In an embodiment of this disclosure, the width of the separation structure produced may be 1 μm to 5 μm.

Exemplarily, a resin having a relatively high transmittance may be selected as the material which forms the separation structure. By producing the separation structure from a resin, on the one hand, it is allowed that this separation structure can substitute for liquid crystal molecules in the position where the separation structure in the related art is located, and on the other hand, the transmittance of the liquid crystal lens will not be affected. Furthermore, the display effect of the naked-eye 3D display apparatus produced from this liquid crystal lens may be ensured. Particularly, the material of the separation structure may be selected from a methyl acrylate resin, an ethyl acrylate resin, a 2-methyl methacrylate resin, 2-ethyl methacrylate resin, or the like.

The above embodiments are only specific embodiments of the disclosure, but the scope of the disclosure is not limited thereto. Within the technical scope disclosed by this disclosure, any person skilled in the art can easily conceive variations or replacements, which should be covered by the scope of the disclosure. Therefore, the protection scope of the disclosure should be determined by the protection scope of the claims.

What is claimed is:

1. A liquid crystal lens, comprising: a first substrate and a second substrate, wherein a plurality of prism units are provided between the first substrate and the second substrate, each of the prism units comprises a first electrode and a second electrode group, the second electrode group comprises a plurality of second electrodes, the plurality of second electrodes are arranged in a line in a first direction, a liquid crystal layer is provided between the first electrode and the second electrode group, the first electrode and the second electrode group are configured to apply drive voltage to the liquid crystal layer to form a gradient electric field in the prism unit, the gradient electric field makes long axes of the liquid crystal molecules in the liquid crystal layer to change in the first direction in the prism unit from being perpendicular to the first substrate at one end of the prism unit to being parallel to the first substrate at the other end of the prism unit, a transparent insulating prism unit-separating structure is provided between two prism units adjacent in the first direction, and refractive index of the prism unit-separating structure is the same as that of the long axis of the liquid crystal molecule constituting the liquid crystal layer, and an orthogonal projection of the prism unit-separating structure on the second substrate is outside an orthogonal projection of the second electrode on the second substrate, and there is no electrode on a surface of the prism unit-separating structure, so that upon the drive voltage being applied, long axes of liquid crystal molecules at one side of the prism unit-separating structure are perpendicular to the first substrate, while axes of liquid crystal molecules at the other side of the prism unit-separating structure are parallel to the first substrate, wherein the prism unit-separating structure has a total height less than the thickness of the liquid crystal layer, and the direction of the height of the prism unit-separating structure is the same as the direction of the thickness of the liquid crystal layer.

2. The liquid crystal lens according to claim 1, wherein the first electrode is provided on the first substrate, and the second electrodes are provided on the second substrate.

3. The liquid crystal lens according to claim 2, wherein the prism unit-separating structure is merely provided on the second substrate, the height of the prism unit-separating structure is ½ to ⅔ of the thickness of the liquid crystal layer, and the height direction of the prism unit-separating structure is consistent with the thickness direction of the liquid crystal layer.

4. The liquid crystal lens according to claim 2, wherein the prism unit-separating structure consists of a first separator and a second separator, the first separator is provided on the first electrode, the second separator is provided on the second substrate, the height of the first separator and the height of the second separator are ¼ to less than ½ of the thickness of the liquid crystal layer, and the height directions of the first separator and the second separator are consistent with the thickness direction of the liquid crystal layer.

5. The liquid crystal lens according to claim 1, wherein the prism unit-separating structure has a width of 1 μm to 5 μm along the direction parallel with the first substrate or the second substrate.

6. The liquid crystal lens according to claim 1, wherein the material of the prism unit-separating structure is a resin.

7. A method for producing a liquid crystal lens, comprising:
providing a first substrate and a second substrate; and
forming a plurality of prism units between the first substrate and the second substrate, wherein each of the prism units comprises a first electrode and a second electrode group, the second electrode group comprises a plurality of second electrodes, the plurality of second electrodes are arranged in a line in a first direction, a liquid crystal layer is provided between the first electrode and the second electrode group, the first electrode and the second electrode group are configured to apply drive voltage to the liquid crystal layer to form a gradient electric field in the prism unit, gradient electric field makes long axes of the liquid crystal molecules in the liquid crystal layer to change in the first direction in the prism unit from being perpendicular to the first substrate at one end of the prism unit to being parallel to the first substrate at the other end of the prism unit, and wherein a transparent insulating prism unit-separating structure is provided between two prism units adjacent in the first direction, and refractive index of the prism unit-separating structure is the same as that of the long axis of the liquid crystal molecule constituting the liquid crystal layer, and an orthogonal projection of the prism unit-separating structure on the second substrate is outside an orthogonal projection of the second electrode on the second substrate, and there is no electrode on a surface of the prism unit-separating structure, so that upon the drive voltage being applied, long axes of liquid crystal molecules at one side of the prism unit-separating structure are perpendicular to the first substrate, while axes of liquid crystal molecules at the other side of the prism unit-separating structure are parallel to the first substrate,
wherein the prism unit-separating structure has a total height less than the thickness of the liquid crystal layer, and the direction of the height of the prism unit-separating structure is the same as the direction of the thickness of the liquid crystal layer.

8. The method for producing a liquid crystal lens according to claim 7, wherein forming the plurality of prism units comprises:
forming the first electrode on the first substrate;
forming a plurality of second electrode groups on the second substrate, wherein each of the second electrode groups comprises a plurality of second electrodes;
forming the liquid crystal layer on the second electrode group;
forming the prism unit-separating structure between two adjacent second electrode groups; and
cell-aligning by using the first substrate and the second substrate.

9. The method for producing a liquid crystal lens according to claim 8, wherein forming the prism unit-separating structure between two adjacent second electrode groups comprises:
forming the prism unit-separating structure on the second substrate, wherein the height of the prism unit-separating structure is ½ to ⅔ of the thickness of the liquid crystal layer, and the height direction of the prism unit-separating structure is consistent with the thickness direction of the liquid crystal layer.

10. The method for producing a liquid crystal lens according to claim 8, wherein forming the prism unit-separating structure between two adjacent second electrode groups comprises:
forming a first separator on the first electrode and forming a second separator on the second substrate, wherein the height of each of the first separator and the second separator is ¼ to less than ½ of the thickness of the liquid crystal layer, and the height directions of the first separator and the second separator are consistent with the thickness direction of the liquid crystal layer.

11. The method for producing a liquid crystal lens according to claim 7, wherein the material of the prism unit-separating structure is a resin.

12. A display apparatus, comprising the liquid crystal lens as claimed in claim 1.

* * * * *